June 1, 1965 J. LINKE ETAL 3,186,303
ROCKET PROJECTOR WITH MAGAZINE
Filed June 4, 1963 4 Sheets-Sheet 2

Johannes Linke and
Eberhard Berck,
Inventors
By Wenderoth, Lind and Ponack,
Attorneys June 1, 1965   J. LINKE ETAL   3,186,303
ROCKET PROJECTOR WITH MAGAZINE
Filed June 4, 1963   4 Sheets-Sheet 3

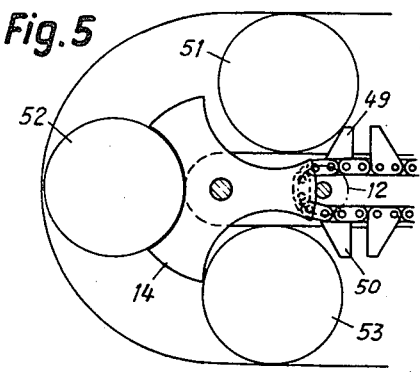
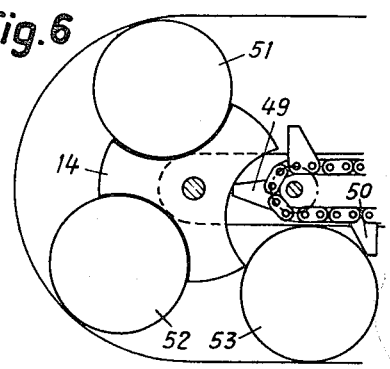
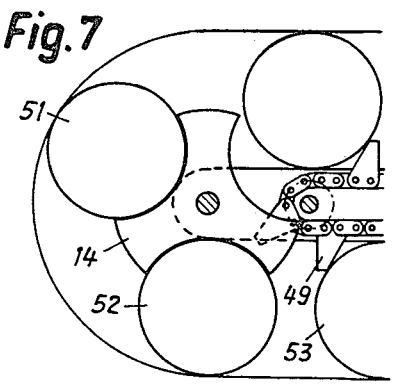
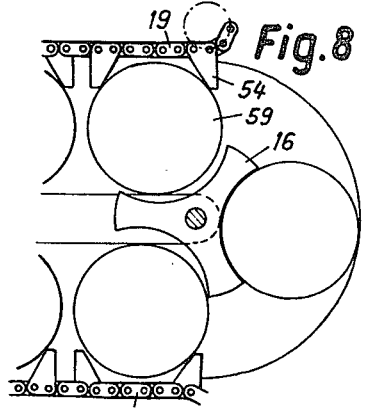
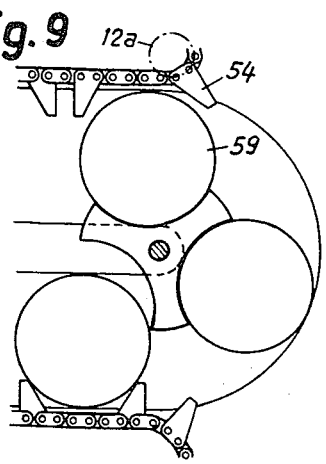
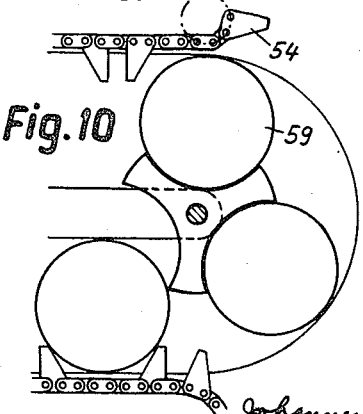

3,186,303
ROCKET PROJECTOR WITH MAGAZINE

Johannes Linke and Eberhard Berek, Zurich, Switzerland, assignors to Machine-Tool Works Oerlikon, Administration Company, Zurich Switzerland
Filed June 4, 1963, Ser. No. 285,524
Claims priority, application Switzerland, June 4, 1962, 6,708/62
16 Claims. (Cl. 89—1.7)

The invention relates to a rocket projector with a magazine wherein by the side of the loading chamber a conveyer drum and a supply device are arranged, the said supply device feeding the rockets lying parallel to one another in curved guides to said conveyer drum which is in driving connection therewith.

In a known rocket projector of this kind the rockets are stored in the magazine in U-shaped curved guides and are fed to a conveyer drum by a tubular carrier arranged behind the rockets, said tubular carrier being fixed to a strip which is coiled on a drum capable of being coupled with the conveyer drum. Such rocket conveyers have the disadvantage that they assume an unfavourable elongated shape in case a greater number of rockets is to be stored. Such embodiments are, for example, unsuitable for a twin-arrangement of the projectors on an armoured fighting vehicle. Moreover the loading of such rocket projectors is complicated since the rockets can be brought only singly through the loading chamber to the magazine.

The present invention has the principal object of providing a rocket projector which allows to accommodate a larger store of rockets and yet has a more favourable shape so that it can be used in twin-arrangement on armoured fighting vehicles. It is another object of the present invention to provide improved loading facilities, allowing the rocket projector to be loaded from transport containers containing several rockets.

With these and other objects in view we provide a rocket projector comprising in combination: rockets, a magazine having a loading chamber, a conveyer drum lying by the side of said loading chamber and a supply device arranged in said magazine, said supplying device having zig-zag-shaped curved guides which in operation guide said rockets, lying parallel to one another, to said conveyer drum, said conveyer drum feeding in operation said rockets for being fired to said loading chamber, said magazine having a loading aperture and two endless conveyer chains lying on top of one another between said aperture and said conveyer drum, dogs mounted on and projecting from said chains in operation engaging said rockets, deflector points deflecting each of said conveyer chains, pairs of star wheels arranged between the adjacent deflector points of two conveyer chains and transferring in operation the rockets from one conveyer chain to the other, and reversible driving means connecting said pair of star wheels with said conveyer chains and with said conveyer drum.

These and other features of our said invention will be clearly understood from the following description of a preferred embodiment thereof illustrated by way of example in the accompanying drawings wherein:

FIGURES 5–10 are diagrammatic illustrations of different phases of the conveying of the rockets.

Figure 1:
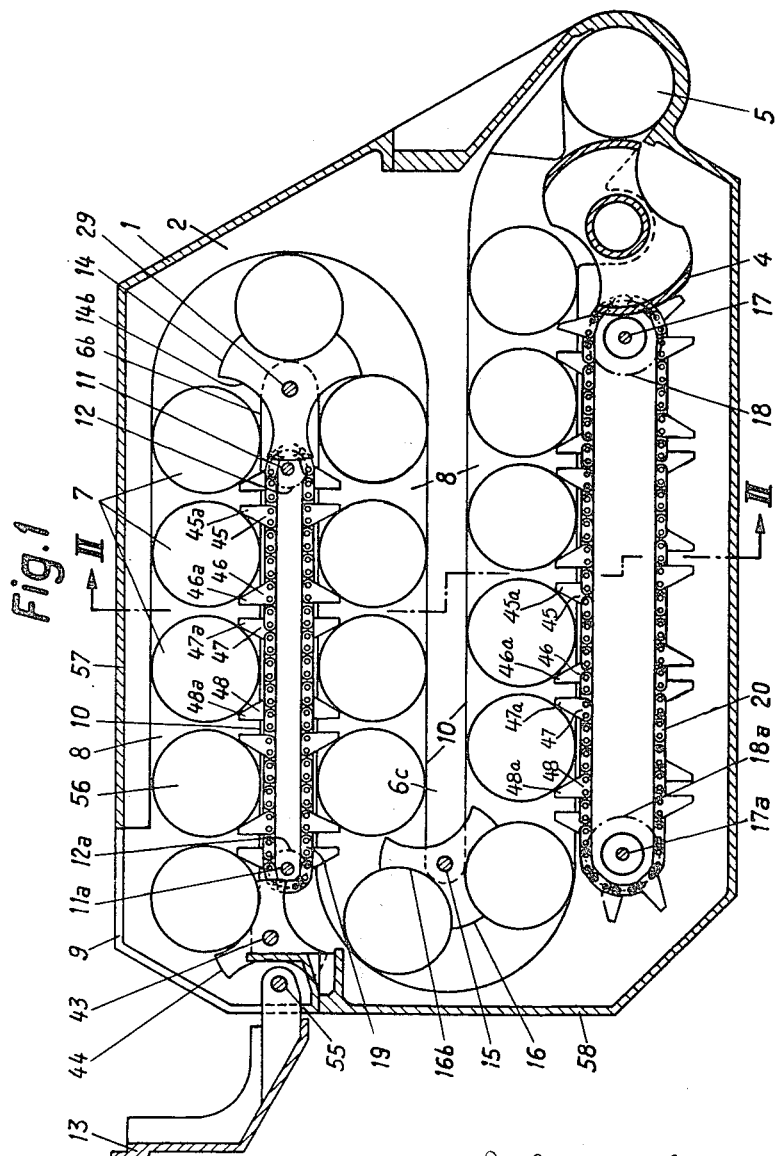
FIGURE 1 is a cross section of the rocket projector on the line I—I in FIGURE 2.
Figure 2:
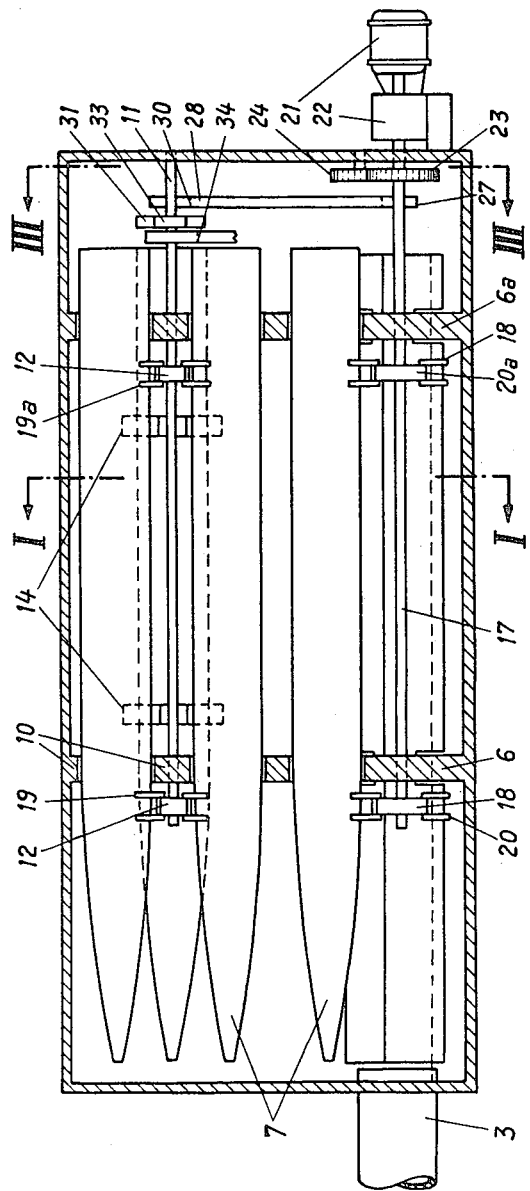
FIGURE 2 is a longitudinal section on the line II—II of FIGURE 1.

The rocket projector according to FIGURES 1 and 2 consists substantially of the magazine 2, the firing device and the casing 1 enclosing these components and from which the starter tube 3 projects. The components forming the firing device namely the feeder drum 4 which together with the closure flap not shown in the drawing lie by the side of the loading chamber 5, and are described and illustrated in detail in the United States of America patent specification No. 2,915,945. Two transverse walls 6 and 6a with cut-outs are inserted in the casing and connected therewith. These cut-outs 8 form with their boundary faces zig-zag shape bent guides 10 for the rocket 7 and also for the rockets 51, 52, 53, 56 and 59. The width of the cuts-outs 8 corresponds to the diameter of the rockets 7 etc. which are pushed from the loading aperture 9 along the guides 10 up to the conveyer drum 2 by means of the supply devices to be described later.

Figure 3:
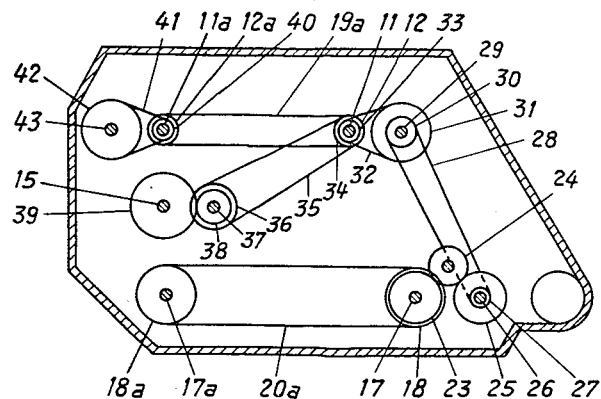
FIGURE 3 is a cross section on the line III—III of FIGURE 2 on a reduced scale and with a diagrammatic illustration of the driving means.

According to the FIGURES 1–3, in the upper part of the transverse walls 6, 6a, two shafts 11, 11a are journalled at the same level, on each of which shafts a pair of sprocket wheels 12 and 12a is mounted. The transverse walls 6, 6a, form moreover the bearings for a shaft 29 serving as the carrier for a pair of star wheels 14, and which is mounted outside the shafts 11, 11a, but at the same level as the latter. In the same manner the two shafts 17, 17a, with pairs of sprocket wheels 18, 18a, mounted thereon are journalled on the lower part of the transverse walls 6, 6a, at the level of the conveyer drum 4. According to FIGURE 1, the endless conveyer chains 19, 19a, and 20, 20a, in the form of roller chains are placed over the pairs of sprocket wheels 12, 12a, as well as 18, 18a, which are arranged behind one another in planes perpendicular to the direction of firing. A further pair of star wheels 16 is mounted on a shaft 15 journalled in the transverse walls between adjacent reversal points of the superimposed conveyer chains 19, 20 and 19a, 20a, respectively.

The reversible motor 21 illustrated in FIGURE 2 drives through a reduction gearing 22 of the shafts 17 and thereby according to FIGURE 3, also the conveyer chains 20, 20a. The spur gear 23 mounted on the shafts 17 is in mesh with a spur gear 24 journalled on the wall of the casing 1. This intermediate gear 24 is in mesh with a gear 25, which is in active driving connection with the shaft 26 connected with the conveyer drum 4, on which shaft the sprocket wheel 27 is mounted. A chain 28 placed over this sprocket wheel 27 drives the sprocket wheel 30 mounted on the shaft 29. On this same shaft 29 is mounted, in addition to the star wheels 14, also the wheel 32, which through a chain 32 drives the sprocket wheel 33 and accordingly the shaft 11. The wheel 34 connected with this shaft 11 drives, through the chain 35, the wheel 36 and accordingly the shaft 37. On the latter the gear wheel 38 is mounted in mesh with the gear wheel 39, which drives the shaft 15 and accordingly the star wheels 16 mounted on the latter. On the shaft 11 moreover the sprocket wheels 12 are mounted which, through the conveyer chains 19, 19a, are in driving connection with the sprocket wheels 12a, accordingly also with the shaft 11a. A chain 41 driven by a sprocket wheel 40 mounted on the shaft 11a drives through the sprocket wheel 42 the shaft 43, and accordingly two star wheels 44 mounted thereon (FIGURE 1).

Figure 4:
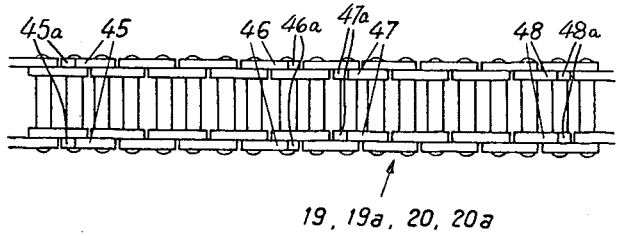
FIGURE 4 is a plan view of parts of a conveyer chain.

Several chains links 45–48 of the chains 19, 19a, and 20, 20a, serving for the conveying of the rockets are provided with dogs 45a–48a, as shown in FIGURES 1 and 4, those dogs 45a–47a, which engage a rocket from one side and those dogs 46a–48a engaging the same rocket from the other side affixing the same and being arranged on different chain links 45, 47 and 46, 48, respectively. Any two of the pairs of links e.g. 45, 46, or 47, 48 form pairs of dogs which hold the rocket between the outer narrow ends of their pawls practically without play and guide the same along the guides 10. These pairs of dogs are so arranged on the chains that the rockets arranged in series are separated from one another only by small intervals. The chains are moreover so arranged that they will not carry the weight of the rockets conveyed by them.

The two pairs of star wheels 14 and 16 have three recesses 14b, 16b arranged at equal angular distances from one another the radii of which correspond to those of the cylindrical parts of the rockets, the innermost points of the recesses lying on a pitch circle around the axis of rotation of the star wheel the diameter of which is equal to the height of the tongue-shaped part 6b or 6c, respectively, of the transveres walls 6, 6a.

Moreover the tongue-shaped parts 6b, 6c, the sprocket wheels 12, 12a, 18, 18a, and the connecting elements 23–33 between the sprocket wheels 12, 12a and the wheels 18, 18a, are so dimensioned, that the conveyer chains 19, 19a, and 20, 20a, have the same velocities of circulation, and the transmission members 34–39, which form the driving connection between the shaft 11 of the conveyor chains and the shaft 15 of the star wheels, impart such a rotational velocity to the pair of star wheels 16, that the lateral velocity of the axes of the rockets transported by the pair of star wheels 16 is slightly larger than the circumferential velocity of the conveyer chains and accordingly slightly exceeds the lateral velocity of the rockets located on the straight portions of the conveyor chains.

In order that the dogs do not hamper the transition of a rocket from the chains 19, 19a, to the pair of star wheels 16 or from the pair of star wheels 16 to the chains 20, 20a, the axis of rotation of the pair of star wheels 16 is arranged substantially in a plane defined by the axes of rotation of the adjacent sprocket wheels 12a, and 18a.

Moreover the conveyer drum 4 is so dimensioned and forms with the gearing 23, 24, 25, such a ratio that also the conveyor drum 4 imparts a lateral velocity to the axes of the rockets transported by it, which is slightly larger than the circumferential velocity of the conveyer chains. The rotational speed of the conveyor drum 4 is 1½ times as high as that of the pair of star wheels 14, 16, which in turn rotate three times slower than the shafts 11, 11a, of the sprocket wheels.

From the construction described results the following manner of operation:

During the firing i.e. during the period, in which the rockets are conveyed from the magazine to the loading chamber, the conveyer drum 4, and the conveyer chains 19, 19a, and 20, 20a and the pairs of stars wheels 14 and 16 move with uniform velocity. The rockets of the uppermost layer moved by the conveyer chains 19, 19a are, as shown in FIGURE 1 as well as in FIGURES 5 and 7, taken over by the star wheels 14, deflected 180° and subsequently transferred again to the dogs of the same chains 19, 19a and carried along by the same. The pair of dogs, denoted in these FIGURES 5–7 by the numerals 49, 50, which have brought the rocket 51 to the star wheels 14, by having jumped over the rocket 52 lying in the latter, take over the rocket denoted by the numeral 53.

By the provision of star wheels 14 guiding the rockets during their deflection a disadvantage is prevented which would occur when the rockets during this phase of movement were moved by the dogs of the chains. In this case the rockets could not be held any more without play by the dogs moving away from another during the deflection of the chain so that they were exposed to undesirable jerks and jolts during the run of a vehicle carrying a rocket projector.

The transfer of the rockets from the chains 19 and 19a to the pair of star wheels 16 and from the latter to the conveyor chains 20, 20a is illustrated in the FIGURES 8–10. The star wheels 16 take over a rocket from a pair of dogs and accelerate the same to the velocity prevailing on the deflector path. Owing to this acceleration, which the rocket undergoes, it is necessary to accelerate also the dog 54 and to remove the same from the path of the rocket 55 (FIGURES 8–10) which is attained by dimensioning the sprocket wheels 12 smaller and giving the chains a narrow pitch. The small distance of the two parts of the chain 19, 19a, resulting from these small diameters of the sprocket wheels, and the consequent small distance of the guide surfaces 10 lying parallel has a favourable effect on the height of the projector. The transfer of the rockets from the star wheels 16 to the conveyer chains 20, 20a, takes place as would be likewise seen from the FIGURES 8–10, in such a manner that the rockets are held practically without play during the whole transfer operation. The movement of the rockets through the conveyer drum into the firing position is effected in the manner described in the aforesaid U.S. patent specification No. 2,915,945.

On a longitudinal edge of the casing 1 adjacent to the ceiling and to the side wall 58, a flap 13 is pivotally mounted on the axle 55 fixed to the casing, which flap serves for the closing of the loading aperture 9. When loading the magazine or supplementing its store of rockets the sense of rotation of the motor and accordingly of the chains 19, 19a and 20, 20a, and of the pairs of star wheels 14 and 16 is changed, namely until the rocket remotest from the conveyer drum 4 lies before the loading aperture 9, i.e. assumes the position of the rocket denoted 56 in FIGURE 1. Then the motor is again set in motion, in the original normal sense of rotation, and through the loading aperture 9 a rocket is inserted into the magazine where the same lies between one of the recesses 44a of the star wheels 44 and the dogs of the chains 19, 19a, and is moved away. Likewise any of the next rockets inserted into the magazine is caught by the rotating star wheels 44 and is conveyed by the same along until it is completely transferred to a pair of dogs of the chains 19, 19a. This process is repeated until the maximum loading condition is attained as illustrated in FIGURE 1.

In the embodiment of a rocket projector described hereinabove by way of example the rockets are stored in a single S-shaped loop. It is, however, within the scope of this invention to accommodate the rockets in the magazine chamber in multiple loops arranged zig-zag-shaped one on top of the other. In this case more than two pairs of conveyer chains with the associated pairs of star wheels have to be arranged in the magazine in order to convey the rockets from one pair of conveyer chains to the next one.

While we have herein described and illustrated in the accompanying drawings what may be considered a typical and particularly advantageous embodiment of our said invention, we wish it to be understood that we do not limit ourselves to the particular details and dimensions described and illustrated; for obvious modifications will occur to persons skilled in the art.

What we claim as our invention and desire to secure by Letters Patent is:

1. A rocket projector comprising in combination: rockets, a magazine having in one part a loading aperture and in another part a loading chamber, said parts lying one above the other, a conveyor drum lying by the side of said loading chamber, a supply device arranged in said magazine and forming for the rockets lying parallel to one another a transport connection between said loading aperture and said conveyor drum, said supply device having zig-zag-shaped curved guides, said conveyer drum feeding in operation said rockets for being fired to said loading chamber, said supply device having further a first and a second endless rocket conveyer chain arranged in the same direction and lying each partly along a loop of said guides, said first chain having an upper and a lower layer and lying on top of said second chain, dogs mounted on and projecting from said chains in operation engaging said rockets, sprocket wheels turning round each of said conveyer chains, a first pair of star wheels arranged in said magazine by the side of said loading aperture parallel to and between the adjacent sprocket wheels of said first and second conveyer chains and transferring in operation the rockets from said first conveyer chain to said second conveyer chain, a second pair of star wheels arranged in said magazine opposite said loading aperture parallel and adjacent in said direction to one of said sprocket wheels of said first conveyor chain and transferring in operation the rockets from said upper layer to said lower layer of said first conveyer chain, a third pair of star wheels arranged in said magazine between said loading aperture and said first chain adjacent and parallel to one of said sprocket wheels by the side of said loading aperture and transmitting the rockets from said loading aperture to said first conveyer chain, and reversible driving means connecting the said pairs of star wheels with said conveyer chains and with said conveyer drum.

2. A rocket projector as claimed in claim 1 wherein said conveyer chains have a small pitch and according to said small pitch a small one of said sprocket wheels and chain links, several of said links having one of said dogs each for the conveying of the rockets, any two of said several links forming pairs of links with first and second ones of said dogs having outer ends for engaging said rockets from opposite sides practically without play and to guide the same along said guides, which have a small distance from each other according to said small pitch of said chains and said small sprocket wheels.

3. A rocket projector as claimed in claim 1, wherein said reversible driving means comprise transmission elements imparting equal circulation velocities to said conveyer chains, and other transmission members imparting to the pairs of star wheels such a rotational velocity, that the lateral velocity of the axes of the rockets transported by the pairs of star wheels exceeds the circumferential velocity of said conveyer chains.

4. A rocket projector comprising in combination: rockets, a magazine having in one part a loading aperture and in another part a loading chamber, said parts lying one above the other, a conveyer drum lying by the side of said loading chamber, and a supply device arranged in said magazine and forming for the rockets lying parallel to one another a transport connection between said loading aperture and said conveyer drum, said supply device having zig-zag-shaped curved guides, said conveyer drum feeding in operation said rockets for being fired to said loading chamber, said supply device having further a first and a second endless rocket conveyer chain arranged in the same direction and lying each partly along a loop of said guides, said first chain having an upper and a lower layer and lying on top of said second chain, dogs mounted on and projecting from said chains in operation engaging said rockets, sprocket wheels turning round each of said conveyer chains, a first pair of star wheels arranged in said magazine by the side of said loading aperture parallel to and between the adjacent sprocket wheels of said first and second conveyer chains and transferring in operation the rockets from said first conveyer chain to said second conveyer chain, a second pair of star wheels arranged in said magazine opposite said loading aperture parallel and adjacent in said direction to one of said sprocket wheels of magazine opposite said loading aperture parallel and adsaid first conveyer chain and transferring in operation the rockets from said upper layer to said lower layer of said first conveyer chain, and reversible driving means connecting said pairs of star wheels with said conveyer chains and with said conveyer drum.

5. A rocket projector as claimed in claim 4 wherein said conveyer chains have a small pitch and according to said small pitch a small one of said sprocket wheels and chain links, several of said links having one of said dogs each for the conveying of the rockets, any two of said several links forming pairs of links with first and second ones of said dogs having outer ends for engaging said rockets from opposite sides practically without play and to guide the same along said guides, which have a small distance from each other according to said small pitch of said chains and said small sprocket wheels.

6. A rocket projector as claimed in claim 5 wherein said guides have parallel inner parts and said pairs of the star wheels have circular recesses arranged at equal angular distances from one another, the radii of which corresponding to those of the cylindrical parts of said rockets to transport the same practically without play, the innermost points of said recesses lying on a pitch line around the axis of rotation of said star wheels, the diameter of said pitch line being equal to the distance of said inner parts of said guides.

7. A rocket projector as claimed in claim 6 wherein said reversible driving means comprise transmission elements imparting equal circulation velocities to said conveyer chains, and other transmission members imparting to the pairs of star wheels such a rotational velocity, that the lateral velocity of the axes of the rockets transported by the pairs of star wheels exceeds the circumferential velocity of said conveyer chains.

8. A rocket projector as claimed in claim 4 wherein said guides have parallel inner parts and said pairs of the star wheels have circular recesses arranged at equal angular distances from one another, the radii of which corresponding to those of the cylindrical parts of said rockets to transport the same practically without play, the innermost points of said recesses lying on a pitch line around the axis of rotation of said star wheels, the diameter of said pitch line being equal to the distance of said inner parts of said guides.

9. A rocket projector as claimed in claim 8 wherein said reversible driving means comprise transmission elements imparting equal circulation velocities to said conveyer chains, and other transmission members imparting to the pairs of star wheels such a rotational velocity, that the lateral velocity of the axes of the rockets transported by the pairs of star wheels exceeds the circumferential velocity of said conveyer chains.

10. A rocket projector as claimed in claim 4 wherein said reversible driving means comprise transmission elements imparting equal circulation velocities to said conveyer chains, and other transmission members imparting to the pairs of star wheels such a rotational velocity, that the lateral velocity of the axes of the rockets transported by the pairs of star wheels exceeds the circumferential velocity of said conveyer chains.

11. A rocket projector comprising in combination: rockets, a magazine having in one part a loading aperture and in another part a loading chamber, said parts lying one above the other, a conveyer drum lying by the side of said loading chamber, and a supply device arranged in said magazine and forming for the rockets lying parallel to one another a transport connection between said loading aperture and said conveyer drum, said supply device having zig-zag-shaped curved guides, said conveyer drum feeding in operation said rockets for being fired to said loading chamber, said supply device having further a first and a second endless rocket conveyer chain arranged in the same direction and lying each partly along a loop of said guides, said first chain having an upper and a lower layer and lying on top of said second chain, dogs mounted on and projecting from said chains in operation engaging said rockets, sprocket wheels turning round each of said conveyer chains, a first pair of star wheels arranged in said magazine by the side of said loading aperture parallel to and between the adjacent sprocket wheels of said first and second conveyer chains and transferring in operation the rockets from said first conveyer chain to said second conveyer chain, and reversible driving means connecting said pair of star wheels with said conveyer chains and with said conveyer drum.

12. A rocket projector as claimed in claim 11 wherein said conveyer chains have a small pitch and according to said small pitch a small one of said sprocket wheels and chain links, several of said links having one of said dogs each for the conveying of the rockets, any two of said several links forming pairs of links with first and second ones of said dogs having outer ends for engaging said rockets from opposite sides practically without play and to guide the same along said guides, which have a small distance from each other according to said small pitch of said chains and said small sprocket wheels.

13. A rocket projector as claimed in claim 12 wherein said guides have parallel inner parts and said pair of the star wheels have circular recesses arranged at equal angular distances from one another, the radii of which corresponding to those of the cylindrical parts of said rockets to transport the same practically without play, the innermost points of said recesses lying on a pitch line around the axis of rotation of said star wheels, the diameter of said pitch line being equal to the distance of said inner parts of said guides.

14. A rocket projector as claimed in claim 11 wherein said guides have parallel inner parts and said pairs of the star wheels have circular recesses arranged at equal angular distances from one another, the radii of which corresponding to those of the cylindrical parts of said rockets to transport the same practically without play, the innermost points of said recesses lying on a pitch line around the axis of rotation of said star wheels, the diameter of said pitch line being equal to the distance of said inner parts of said guides.

15. A rocket projector as claimed in claim 14 wherein said reversible driving means comprise transmission elements imparting equal circulation velocities to said conveyer chains, and other transmission members imparting to the pair of star wheels such a rotational velocity, that the lateral velocity of the axes of the rockets transported by the pair of star wheels exceeds the circumferential velocity of said conveyer chains.

16. A rocket projector as claimed in claim 11 wherein said reversible driving means comprise transmission elements imparting equal circulation velocities to said conveyer chains, and other transmission members imparting to the pair of star wheels such a rotational velocity, that the lateral velocity of the axes of the rockets transported by the pair of star wheels exceeds the circumferential velocity of said conveyer chains.

References Cited by the Examiner

UNITED STATES PATENTS

| | | | |
|---|---|---|---|
| 2,180,741 | 11/39 | Lisov | 89—33.17 |
| 2,440,634 | 4/48 | Henney | 89—33 X |
| 2,789,470 | 4/57 | Bronson | 89—1.7 |
| 2,800,056 | 7/57 | Atherton | 89—33 |
| 2,915,945 | 12/59 | Linke et al. | 89—33 X |

FOREIGN PATENTS 759,060  10/56  Great Britain.

BENJAMIN A. BORCHELT, *Primary Examiner.*

SAMUEL W. ENGLE, *Examiner.*